United States Patent
Ha

(10) Patent No.: US 12,013,556 B2
(45) Date of Patent: Jun. 18, 2024

(54) COMPACT OPTICAL DEVICE FOR AUGMENTED REALITY

(71) Applicant: LETINAR CO., LTD, Seoul (KR)

(72) Inventor: Jeong Hun Ha, Seoul (KR)

(73) Assignee: LETINAR CO., LTD, Seoul (KR)

( * ) Notice: Subject to any disclaimer, the term of this patent is extended or adjusted under 35 U.S.C. 154(b) by 774 days.

(21) Appl. No.: 17/256,116

(22) PCT Filed: Oct. 23, 2019

(86) PCT No.: PCT/KR2019/013928
§ 371 (c)(1),
(2) Date: Dec. 24, 2020

(87) PCT Pub. No.: WO2020/171338
PCT Pub. Date: Aug. 27, 2020

(65) Prior Publication Data
US 2021/0132270 A1 May 6, 2021

(30) Foreign Application Priority Data

Feb. 22, 2019 (KR) .................. 10-2019-0020906
Oct. 22, 2019 (KR) .................. 10-2019-0131552

(51) Int. Cl.
*G02B 5/10* (2006.01)
*G02B 27/01* (2006.01)
*G02C 7/02* (2006.01)

(52) U.S. Cl.
CPC ............ *G02B 5/10* (2013.01); *G02B 27/0172* (2013.01); *G02B 2027/0178* (2013.01); *G02C 7/02* (2013.01)

(58) Field of Classification Search
CPC .. G02B 27/01; G02B 27/017; G02B 27/0101; G02B 27/0107; G02B 27/0172;
(Continued)

(56) References Cited

U.S. PATENT DOCUMENTS 10,838,132 B1* 11/2020 Calafiore ............. G02B 6/0015
2011/0057863 A1* 3/2011 Sugihara ............ G02B 27/0172
345/8
(Continued)

FOREIGN PATENT DOCUMENTS

CN 108064351 A 5/2018
JP 2000511306 A 8/2000
(Continued)

*Primary Examiner* — Sultan Chowdhury
(74) *Attorney, Agent, or Firm* — Rabin & Berdo, P.C.

(57) ABSTRACT

Disclosed herein is a compact optical device for augmented reality. The compact optical device includes: an optical means configured to transmit at least part of image light, output from a real object, therethrough toward a pupil of an eye of a user and to reflect image light corresponding to an image for augmented reality, output from an image output unit, on an inner surface thereof and transfer the image light corresponding to an image for augmented reality to a first reflective unit; a first reflective unit disposed inside the optical means, and configured to reflect the image light corresponding to the image for augmented reality transferred from the inner surface of the optical means by reflection and transfer the image light corresponding to the image for augmented reality to a second reflective unit; and a second reflective unit disposed inside the optical means, and configured to reflect the image light corresponding to the image for augmented reality, transferred from the first reflective unit, and transfer the image light corresponding to an image for augmented reality toward the pupil of the eye of the user, thereby providing the image for augmented reality to the user; wherein the second reflective unit has a size smaller than 8 mm.

18 Claims, 8 Drawing Sheets

(58) Field of Classification Search
CPC .......... G02B 27/0178; G02B 2027/012; G02B 2027/017; G02B 2027/0125; G02B 2027/0127; G02B 2027/0165; G02B 2027/0172; G02B 2027/0178; G02B 3/00; G02B 3/43; G02B 5/08; G02B 5/10; G02C 7/086; G02C 7/02
See application file for complete search history.

(56) References Cited

U.S. PATENT DOCUMENTS

| | | | |
|---|---|---|---|
| 2012/0002294 | A1 | 1/2012 | Dobschal et al. |
| 2018/0292652 | A1 | 10/2018 | Ha |
| 2019/0004325 | A1* | 1/2019 | Connor ............ G02B 27/0172 |
| 2019/0204601 | A1* | 7/2019 | Ha .................... G02B 27/0172 |
| 2019/0353897 | A1* | 11/2019 | Suzuki .............. G02B 27/0081 |
| 2019/0377122 | A1* | 12/2019 | Danziger ............... G02C 7/061 |
| 2020/0152105 | A1* | 5/2020 | Ishii .................. G02B 27/0172 |

FOREIGN PATENT DOCUMENTS

| | | | |
|---|---|---|---|
| JP | 2002031777 | A | 1/2002 |
| JP | 2007286317 | A | 11/2007 |
| KR | 1020010060284 | A | 7/2001 |
| KR | 1020020066889 | A | 8/2002 |
| KR | 101660519 | B1 | 9/2016 |
| KR | 1020160109021 | A | 9/2016 |
| KR | 1020180028339 | A | 3/2018 |
| WO | 2018048018 | A1 | 3/2018 |

* cited by examiner

COMPACT OPTICAL DEVICE FOR AUGMENTED REALITY

TECHNICAL FIELD

The present invention relates generally to an optical device for augmented reality, and more particularly to a compact optical device for augmented reality that does not require additional optical means while increasing the field of view using a plurality of small-sized reflective units, thereby allowing the size, thickness, and volume thereof to be significantly reduced.

BACKGROUND ART

Augmented Reality (AR) refers to technology that superimposes a virtual image, generated by a computer or the like, on a real image of the real world and then provides a resulting image, as is well known.

In order to implement augmented reality, there is required an optical system that allows a virtual image, generated by a device such as a computer, to be superimposed on an image of the real world and a resulting image to be provided. As such an optical system, there is known a technology using an optical means such as a prism for reflecting or refracting a virtual image using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a technology using a configuration such as a prism capable of adjusting focal length for a virtual image and a technology for electrically controlling a variable focal lens in response to a change in focal length. However, these technologies also have a problem in that a user needs to perform a separate operation in order to adjust focal length or hardware such as a separate processor for controlling focal length and software are required.

In order to overcome the problems of the conventional technologies, the present applicant has developed an optical device capable of implementing augmented reality by projecting a virtual image on the retina through the pupil using a reflective unit having a size smaller than that of a human pupil, as described in Patent Document 1.

FIG. 1 is a diagram showing the optical device for augmented reality disclosed in Patent Document 1.

Referring to FIG. 1, an image output unit 30 is a means for outputting augmented reality image light corresponding to an image for augmented reality, and may be implemented as, for example, a small-sized display device. A reflective unit 20 provides an image for augmented reality to a user by reflecting augmented reality image light, output from the image output unit 30, to the pupil of the user.

An optical means 10 is a means for transmitting at least part of real object image light, which is image light output from a real object, therethrough, and may be, e.g., a lens of eyeglasses. The reflective unit 20 is embedded inside the optical means 10. A frame unit 40 is a means for fixing and supporting both the image output unit 30 and the optical means 10.

The reflective unit 20 shown in FIG. 1 is formed to have a size smaller than that of the average pupil of people, i.e., 8 mm. By forming the reflective unit 20 to be smaller than the average pupil of people as described above, the depth of field for light entering the pupil through the reflective unit 20 may be made almost infinite, i.e., considerably deep. In this case, the depth of field refers to a range within which an image for augmented reality is recognized as being in focus. When the depth of field increases, a focal distance for an image for augmented reality increases. Accordingly, even when a user changes the focal distance for the real world while gazing at the real world, an image for augmented reality is always recognized as being in focus regardless of such a change of the focal distance for the real world. This may be called as a kind of pinhole effect. Accordingly, the optical device for augmented reality is always able to provide a clear virtual image for an image for augmented reality even when a user changes the focal distance while gazing at a real object in the real world.

However, although this technology can increase the depth of field and achieve a pinhole effect, a problem still arises in that the field of view is narrow, and a limitation arises in that the size, thickness, and volume of the device increase because additional optical means such as a collimator for parallel light are required.

Patent Document 1

Korean Patent No. 10-1660519 (published on Sep. 29, 2016)

DISCLOSURE

Technical Problem

The present invention has been conceived to overcome the above-described limitations, and an object of the present invention is to provide a compact optical device for augmented reality that does not require additional optical means while increasing the field of view using a plurality of small-sized reflective units, thereby allowing the size, thickness, and volume thereof to be significantly reduced.

Furthermore, another object of the present invention is to provide a compact optical device for augmented reality that minimizes a ghost image and reduces the leakage of light to the outside, thereby providing a clearer virtual image.

Furthermore, another object of the present invention is to provide a glasses-shaped augmented reality providing apparatus that has a significantly reduced size, thickness, and volume, thereby allowing a person to wear it without discomfort.

Technical Solution

In order to overcome the above-described technical problems, the present invention provides a compact optical device for augmented reality, the compact optical device including: an optical means configured to transmit at least part of image light, output from a real object, therethrough toward a pupil of an eye of a user and to reflect image light corresponding to an image for augmented reality, output from an image output unit, on an inner surface thereof and transfer the image light corresponding to an image for augmented reality to a first reflective unit; a first reflective unit disposed inside the optical means, and configured to reflect the image light corresponding to the image for augmented reality transferred from the inner surface of the optical means by reflection and transfer the image light corresponding to the image for augmented reality to a second reflective unit; and a second reflective unit disposed inside the optical means, and configured to reflect the image light corresponding to the image for augmented reality, transferred from the first reflective unit, and transfer the image light corresponding to an image for augmented reality toward the pupil of the eye of the user, thereby providing the image for augmented reality to the user; wherein the second reflective unit has a size smaller than 8 mm.

In this case, the optical means may have a first surface which the image light output from the real object enters, and a second surface through which the image light corresponding to the image for augmented reality transferred through the second reflective unit is output; and the image light corresponding to the image for augmented reality from the image output unit may be reflected on the first surface of the optical means and transferred to the first reflective unit.

Further, the image output unit may be disposed to be inclined with respect to the first surface so that the image light corresponding to the image for augmented reality is reflected on the first surface of the optical means and transferred to the first reflective unit.

Furthermore, the first reflective unit may be disposed between the first surface and the second surfaces in order to reflect the image light corresponding to the image for augmented reality toward the second reflective unit.

Furthermore, the first reflective unit may be formed in a curved shape.

Furthermore, the first reflective unit may be a concave mirror.

Furthermore, the first reflective unit may have a length less than 8 mm in a widthwise direction thereof.

Furthermore, the second reflective unit may be disposed at an inclined angle with respect to a surface of the optical means in order to reflect the image light corresponding to the image for augmented reality, transferred from the first reflective unit, and transfer the image light corresponding to the image for augmented reality toward the pupil of the eye of the user.

Furthermore, the second reflective unit may include a plurality of second reflective units; and each of the second reflective units may be arranged such that the image light corresponding to the image for augmented reality transferred from the first reflective unit is not blocked by remaining second reflective units.

Furthermore, the size of each of the plurality of second reflective units may be smaller than 8 mm.

Furthermore, at least some of the second reflective units may have curved surfaces.

Furthermore, at least some of the second reflective units may have an inclined angle different from an inclined angle of remaining other second reflective units.

Furthermore, the optical means may be a lens having a refractive index.

According to another aspect of the present invention, there is provided a glasses-shaped augmented reality providing apparatus comprising: a lens unit configured to transmit at least part of image light, output from a real object, therethrough toward a pupil of an eye of a user; and a frame unit configured to fix the lens unit; wherein the lens unit is the compact optical device for augmented reality set forth in any one of the above described compact optical devices for augmented reality.

Further, a vision correction lens having a refractive index may be disposed on at least any one of outer and inner sides of the lens unit, or all or part of the lens unit is composed of a vision correction lens having a refractive index.

Advantageous Effects

According to the present invention, there is provided the compact optical device for augmented reality that does not require additional optical means while increasing the field of view using a plurality of small-sized reflective units, thereby allowing the size, thickness, and volume thereof to be significantly reduced.

Furthermore, according to the present invention, there is provided the compact optical device for augmented reality that minimizes a ghost image and reduces the leakage of light to the outside, thereby providing a clearer virtual image.

Furthermore, the present invention has the advantage of providing the glasses-shaped augmented reality providing apparatus that allows the size, thickness, and volume thereof to be significantly reduced, thereby enabling a person to wear it without discomfort.

BEST MODE

Embodiments of the present invention will be described in detail below with reference to the accompanying drawings.

Figure 1:
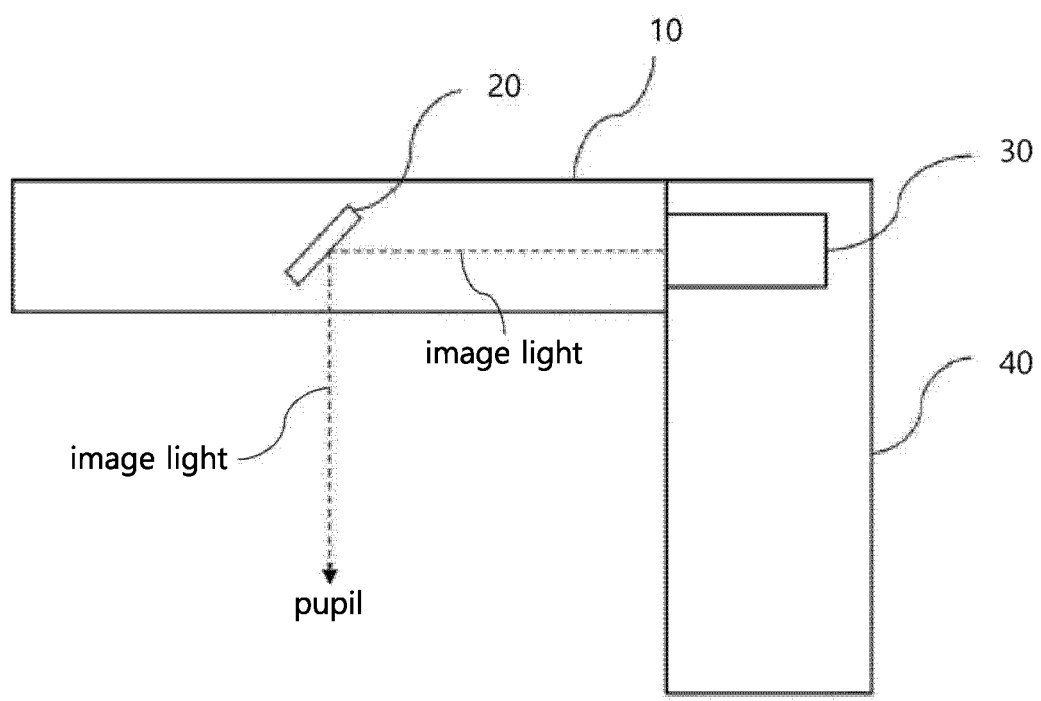
FIG. 1 is a diagram showing an optical device for augmented reality disclosed in Patent Document 1.
Figure 2:
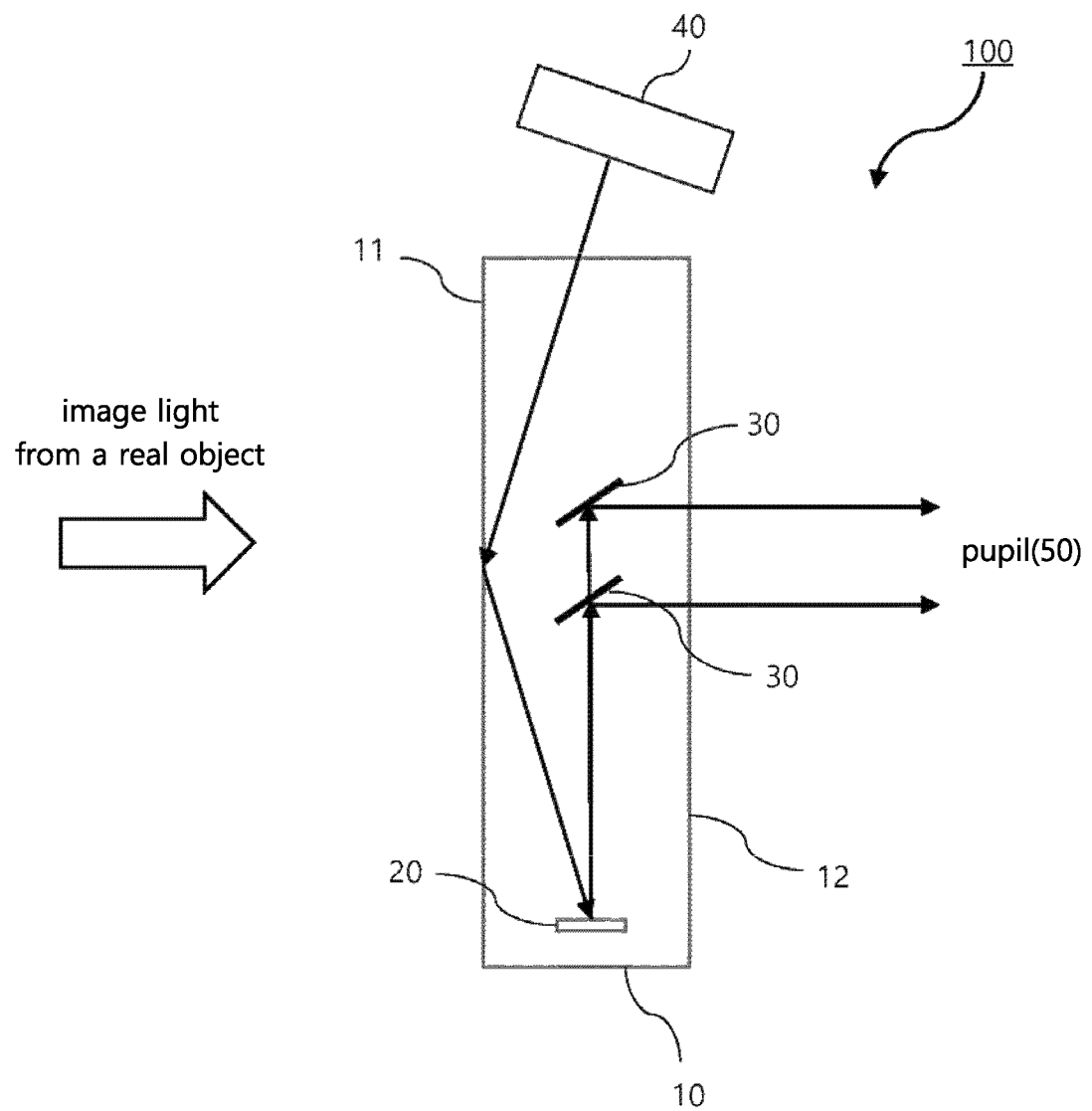
FIG. 2 is a side view of an optical device (100) for augmented reality according to one embodiment of the present invention.
Figure 3:
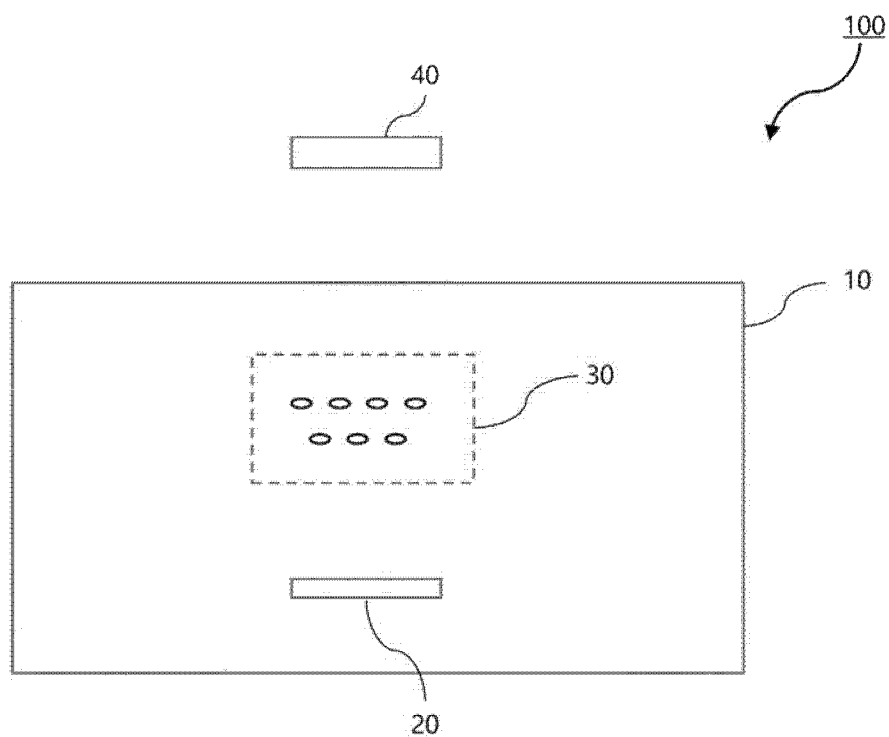
FIG. 3 is a front view of the optical device (100) for augmented reality according to the embodiment of the present invention.
Figure 4:
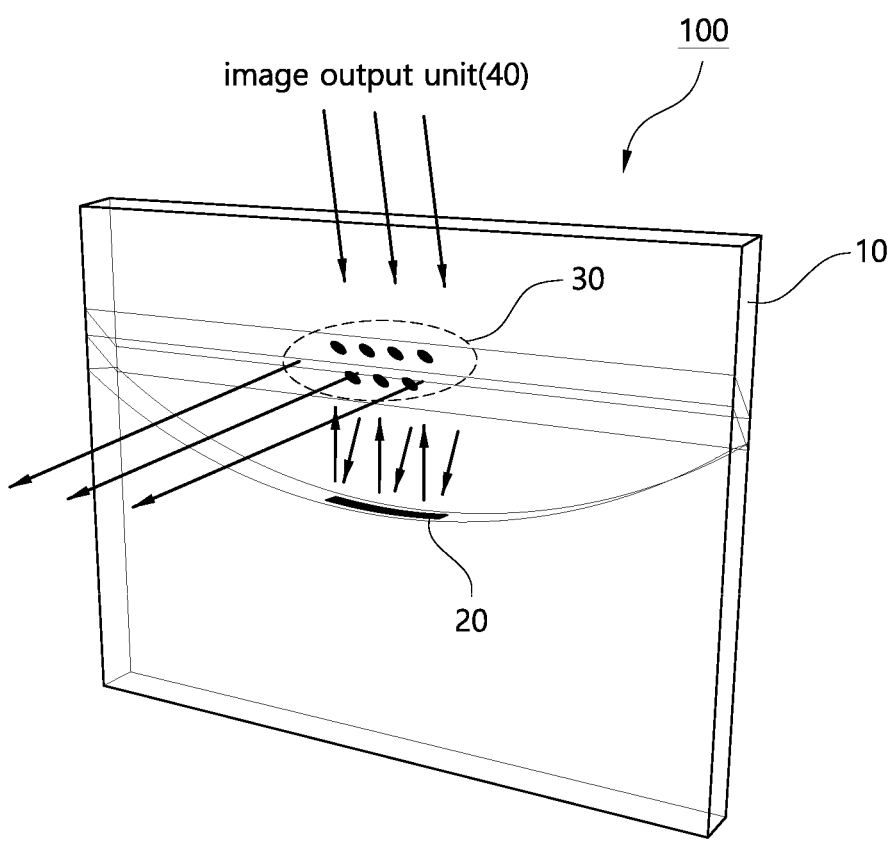
FIG. 4 is a perspective view of the optical device (100) for augmented reality according to the embodiment of the present invention.

FIGS. 2 to 4 are diagrams showing the overall configuration of a compact optical device 100 for augmented reality according to one embodiment of the present invention, wherein FIG. 2 is a side view of the optical device 100 for augmented reality, FIG. 3 is a front view of the optical device 100 for augmented reality, and FIG. 4 is a perspective view of the optical device 100 for augmented reality.

Referring to FIGS. 2 to 4, the compact optical device 100 for augmented reality according to the present embodiment includes an optical means 10, a first reflective unit 20, and a second reflective unit 30.

The optical means 10 is a means for transmitting at least part of image light, output from a real object, therethrough toward the pupil of an eye of a user. Also, the optical means 10 reflects image light corresponding to an image for augmented reality output from an image output unit 40 on an inner surface thereof and transfers the image light corresponding to an image for augmented reality, to the first reflective unit 20.

The optical means 10 includes a first surface 11 which image light output from a real object enters, and a second surface 12 through which image light output from the real object and then transmitted through the first surface 11 and image light corresponding to an image for augmented reality transferred through the second reflective unit 30 are output.

Furthermore, the optical means 10 transfers image light corresponding to an image for augmented reality output from the image output unit 40 to the first reflective unit 20 by reflection on the first surface 11. The image light corresponding to an image for augmented reality, having been reflected by the first reflective unit 20, is reflected again by the second reflective unit 12 and then is output to the pupil 50 of a user through the second surface 12.

Accordingly, the image output unit 40 is disposed to be inclined with respect to the first surface 11 so that the image light corresponding to the image for augmented reality is reflected on the first surface 11 of the optical means 10 and transferred to the first reflective unit 20.

In this case, the image output unit 40 is a means for outputting the image light corresponding to the image for augmented reality toward the optical means 10. The image output unit 40 may be a display device such as a small-sized LCD, or a reflective or refractive means for transferring image light, output from a display device, toward the optical means 10 by reflecting or refracting the image light.

In other words, the image output unit 40 refers to various means such as a display device for displaying an image for augmented reality or a reflective or refractive means for finally transferring image light, output from the display device, to the optical means 10.

Since the image output unit 40 is not a direct target of the present invention and is known in prior art, a detailed description thereof will be omitted herein.

Meanwhile, the image for augmented reality refers to a virtual image which is displayed on a display device and transferred to the pupil 50 of the user through the image output unit 40, the optical means 10, the first reflective unit 20, and the second reflective unit 30. The image for augmented reality may be a still image or moving image.

The image for augmented reality is output from a display device as image light and transferred to the pupil 50 of the user by the image output unit 40, the optical means 10, the first reflective unit 20, and the second reflective unit 30, thereby providing a virtual image to the user. At the same time, the user directly gazes at image light output from a real object present in the real world through the optical means 10. Therefore, the user is provided with an augmented reality service.

The first reflective unit 20 is disposed inside the optical means 10, and is a means for reflecting image light corresponding to an image for augmented reality transferred from the inner surface of the optical means 10 by reflection and transferring the image light corresponding to the image for augmented reality to the second reflective unit 30.

The first reflective unit 20 is disposed between the first surface 11 and the second surface 12 in order to reflect image light corresponding to an image for augmented reality toward the second reflective unit 30. In other words, the first reflective unit 20 is disposed in the internal space of the optical means 10 between the first surface 11 and the second surface 12 so that the image light corresponding to the image for augmented reality output from the first surface 11 of the optical means 10 by reflection can be transferred to the second reflective unit 30 by reflection.

As shown in FIG. 4, the first reflective unit 20 may have a curved surface so that the image light corresponding to the image for augmented reality can be more concentrated on the second reflective unit 30.

Furthermore, the first reflective unit 20 may be composed of a concave mirror.

Meanwhile, as will be described later, the size of the second reflective unit 30 is formed to be smaller than 8 mm, which is the size of the average pupil of people. More preferably, the size of the second reflective unit 30 is formed to be smaller than 4 mm. Accordingly, it is preferable that the length of the first reflective unit 20 in the widthwise direction thereof correspond to the size of the second reflective unit 30. In other words, it is preferable that the length of the first reflective unit 20 in the widthwise direction thereof be less than 8 mm, more preferably 4 mm.

In this case, the widthwise direction of the first reflective unit 20 refers to the direction in which the first reflective unit 20 extends between the first and second surfaces 11 and 12.

Meanwhile, it is preferable that the first reflective unit 20 have a significantly small thickness when viewed from the pupil 50, as shown in FIGS. 3 and 4, in order to allow the user to rarely recognize the first reflective unit 20 through the pupil 50.

When the first reflective unit 20 is formed in a concave mirror shape having a curved surface, the first reflective unit 20 functions as a collimator that collimates image light transferred from the image output unit 40. In other words, the first reflective unit 20 functions to collimate the image light to be transferred to the second reflective unit 30, thereby preventing the images formed by individual pin mirrors from being off-centered from each other when the images transferred from the second reflective unit 30 to the pupil 50 of the user are superimposed on each other.

Furthermore, when the first reflective unit 20 is formed by a mirror having a width less than 8 mm, the first reflective unit 20 functions as an aperture by transferring the image light to be delivered to the pupil 50 of the user among the image light from the image output unit 40 to the second reflective unit 30 by reflection and preventing the stray light, which generates a ghost image on the pupil 50 of the user, from being transferred to the second reflective unit 30 by passing the miscellaneous light therethrough and thus filtering out the stray light.

Figure 5:
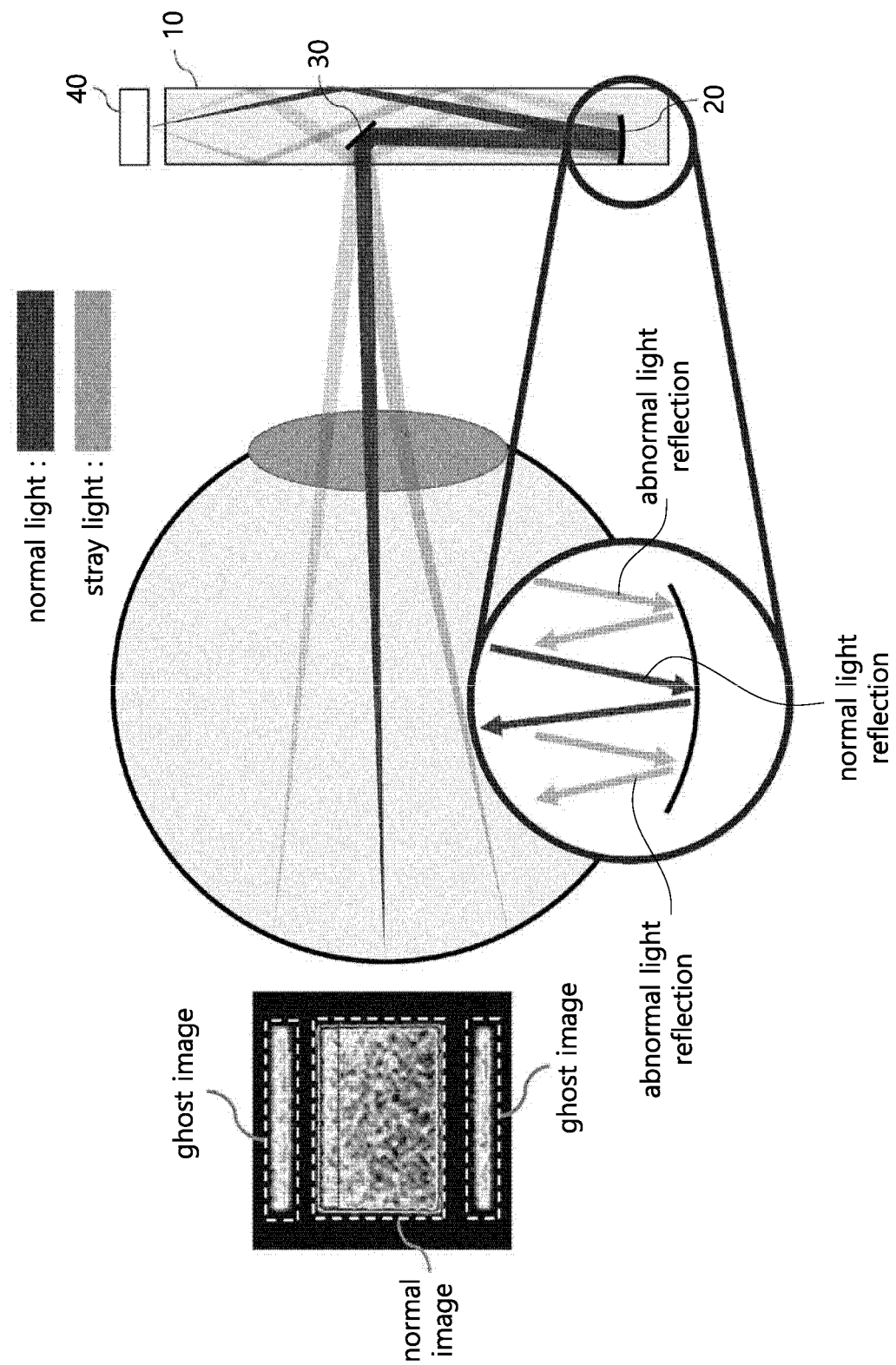
FIG. 5 is a diagram illustrating a state in which a ghost image is generated in a case where the width of a first reflective unit (20) is 8 mm or more.
Figure 6:
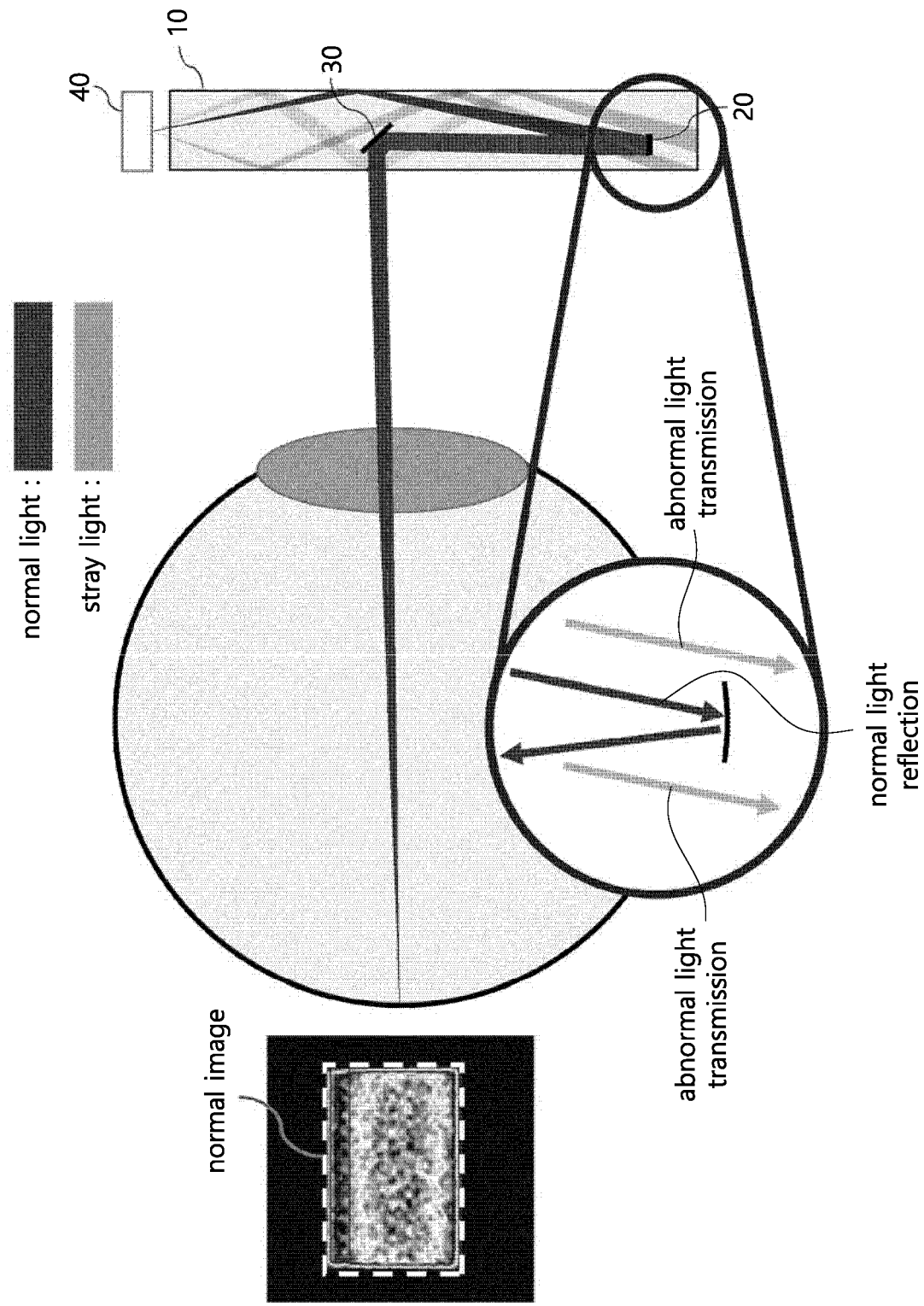
FIG. 6 is a diagram illustrating a state in which a ghost image is not generated in a case where the width of the first reflective unit (20) is less than 8 mm.

FIGS. 5 and 6 are diagrams illustrating the effect of removing a ghost image using the first reflective unit 20. FIG. 5 is a diagram illustrating a state in which a ghost image is generated in a case where the width of the first reflective unit 20 is 8 mm or more, and FIG. 6 is a diagram illustrating a state in which a ghost image is not generated in a case where the width of the first reflective unit 20 is less than 8 mm.

As shown in FIG. 5, when the width of the first reflective unit 20 is equal to or more than 8 mm, which is the size of the average pupil of people, the normal light, which is part of the image light output from the image output unit 40 and is normally reflected on the inner surface of the optical means 10 and then reaches the first reflective unit 20, is transferred to the pupil 50 through the second reflective unit 30. Also, the unintended stray light, which is part of the image light output from the image output unit 40 and generates a ghost image on the pupil 50 due to the difference in output angle, the difference in the number of reflections or the like on the inner surface of the optical means 10 is also reflected on the first reflective unit 20 and transferred to the second reflective unit 30. Accordingly, as shown on the left side of FIG. 5, the user recognizes a ghost image due to the stray light.

Meanwhile, referring to FIG. 6, it can be seen that since the width of the first reflective unit 20 is less than 8 mm, which is the width of the average pupil of people, and the stray light is transmitted through the first reflective unit 20, the stray light is not transferred to the second reflective unit 30 and the pupil 50, so that a ghost image is not generated and the user recognizes only a normal image.

Meanwhile, the second reflective unit 30 is disposed inside the optical means 10, and is a means for reflecting image light corresponding to an image for augmented reality transferred from the first reflective unit 20 and transferring the image light corresponding to an image for augmented reality toward the pupil of an eye of a user 50, thereby providing an image for augmented reality to the user.

The second reflective unit 30 is disposed at an inclined angle with respect to the surface of the optical means 10 so that it can reflect the image light corresponding to the image for augmented reality transferred from the first reflective unit 20 and transfer the reflected image light corresponding to the image for augmented reality to the pupil of the eye of a user 50.

Meanwhile, it is preferable that the second reflective unit 30 be formed to have a size smaller than the size of the average pupil of people, i.e., 8 mm, preferably 4 mm, as described in the description of the related art, so that a pinhole effect can be obtained by increasing the depth of field.

In other words, the second reflective unit 30 is formed to be smaller than the size of the average pupil of people, i.e., 8 mm. By this, the depth of field for the light entering the pupil through the second reflective unit 30 may be made almost infinite, i.e., considerably deep. Accordingly, there may be achieved a pinhole effect that allows an image for augmented reality to be always recognized as being in focus regardless of a change in focal distance even when a user changes the focal distance for the real world while gazing at the real world.

Meanwhile, the second reflective unit 30 may include a plurality of second reflective units 30. In this case, each of the second reflective units 30 is arranged such that the image light corresponding to the image for augmented reality transferred from the first reflective unit 20 is not blocked by the other second reflective units 30, as shown in FIG. 4.

Even in this case, it is preferable that the size of each of the second reflective units 30 is smaller than 8 mm.

Furthermore, at least part of the surface of the second reflective unit 30 may be formed in a curved shape.

Furthermore, the inclined angle of at least some of the second reflective units 30 may be formed to be different from that of the other second reflective units 30.

The second reflective unit 30 provides the effect of considerably reducing a ghost image and the leakage of light to the outside together with the first reflective unit 20. In other words, as described in conjunction with the first reflective unit 20, the first reflective unit 20 and the second reflective unit 30 function as a collimator and a combiner, and also function as an aperture. Accordingly, there may be achieved the effects of removing stray light and preventing external light from being scattered by blocking the light entering at different angles.

Figure 7:
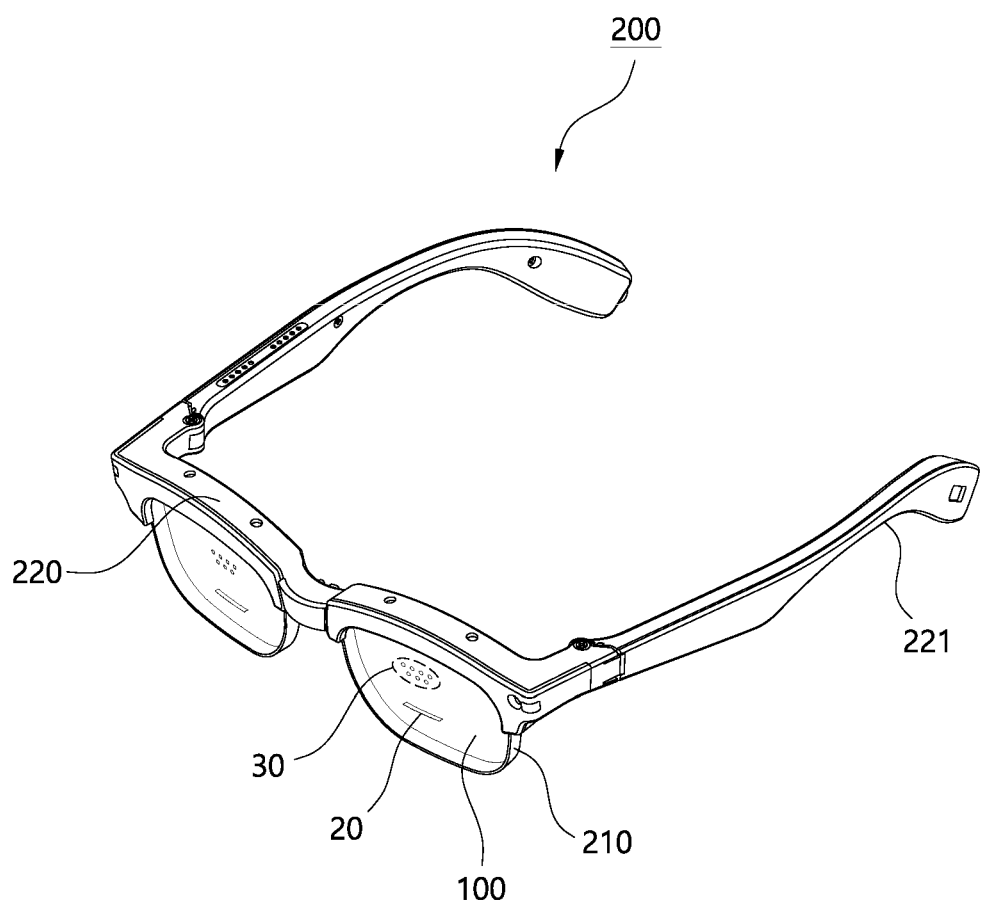
FIGS. 7 and 8 show an example of an augmented reality providing apparatus (200) implemented in the form of glasses using the optical device (100) for augmented reality according to the present invention illustrated in FIGS. 2 to 6.
Figure 8:
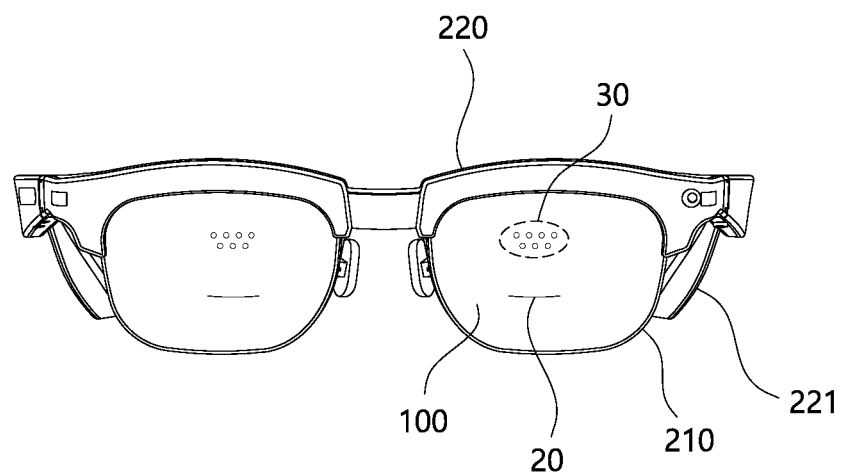

FIGS. 7 and 8 show an embodiment of an augmented reality providing apparatus 200 implemented in the form of glasses using the compact optical device 100 for augmented reality according to the present invention described in conjunction with FIGS. 2 to 6.

As shown in FIGS. 7 and 8, the augmented reality providing apparatus 200 is generally fabricated in the form of glasses including lens units 210 and a frame unit 220 configured to fix the lens units 210. The augmented reality providing apparatus 200 is characterized in that each of the lens units 210 is implemented as the compact optical device 100 for augmented reality, as described above.

In this case, the lens unit 210 corresponds to the optical means 10 of the optical device 100 for augmented reality as described above, and a first reflective unit 20 and a second reflective unit 30 are disposed inside the lens unit 210 in the same manner as described above.

The frame unit 220 may be configured in a conventionally known form of glasses surrounding the lens units 210, and an image output unit 40 may be disposed at an appropriate location of the frame unit 220 as described above. In this case, for example, a connection port configured to enable connection to a smartphone or a computer may be disposed at an end of each of the temples 221 of the frame unit 220 that enables a user to wear the augmented reality providing apparatus 200 on his or her ears, image or video data corresponding to an image for augmented reality may be transmitted to a corresponding one of the image output units 40 through the connection port and the cable formed inside the frame unit 220, and the image output unit 40 may output image light corresponding to the image for augmented reality.

As described above, according to the compact optical device 100 for augmented reality according to the present invention, the overall size, thickness, and volume of the device may be significantly reduced, and thus the size, thickness, and volume of the augmented reality providing apparatus 200 may also be significantly reduced, as shown in FIGS. 7 and 8. Therefore, there may be provided the augmented reality providing apparatus 200 that does not require a complicated configuration and has an excellent fit compared to the prior art.

Meanwhile, in the augmented reality providing apparatus 200 shown in FIGS. 7 and 8, for a user having ametropia, a vision correction lens having a predetermined refractive index may be disposed in at least one of the inner and outer sides of each of the lens units 210. Alternatively, all or part of each of the lens units 210 (the optical means 10) may be composed of a vision correction lens having a predetermined refractive index. According to these configuration, there arises the advantage of providing a vision correction effect according to a user's vision.

Although the present invention has been described with reference to the preferred embodiments of the present invention, it is obvious that the present invention is not limited to the above-described embodiments and other various modifications and alterations may be possible.

The invention claimed is:

1. A compact optical device for augmented reality, the compact optical device comprising:
    an optical means configured to transmit at least part of image light, output from a real object, therethrough toward a pupil of an eye of a user and to reflect image light corresponding to an image for augmented reality, output from an image output unit, on an inner surface thereof and transfer the image light corresponding to an image for augmented reality to a first reflective unit;
    a first reflective unit disposed inside the optical means, and configured to reflect the image light corresponding to the image for augmented reality transferred from the inner surface of the optical means by reflection and transfer the image light corresponding to the image for augmented reality to a second reflective unit; and a second reflective unit disposed inside the optical means, and configured to reflect the image light corresponding to the image for augmented reality, transferred from the first reflective unit, and transfer the image light corresponding to an image for augmented reality toward the pupil of the eye of the user, thereby providing the image for augmented reality to the user;

wherein the second reflective unit has a size smaller than 8 mm, wherein the optical means has a first surface which the image light output from the real object enters, and a second surface through which the image light corresponding to the image for augmented reality transferred through the second reflective unit is output, and wherein the image light corresponding to the image for augmented reality from the image output unit is reflected on the first surface of the optical means and transferred to the first reflective unit.

2. The compact optical device of claim 1, wherein the image output unit is disposed to be inclined with respect to the first surface so that the image light corresponding to the image for augmented reality is reflected on the first surface of the optical means and transferred to the first reflective unit.

3. A glasses-shaped augmented reality providing apparatus comprising:
a lens unit configured to transmit at least part of image light, output from a real object, therethrough toward a pupil of an eye of a user; and
a frame unit configured to fix the lens unit;
wherein the lens unit is the compact optical device for augmented reality set forth in claim 2.

4. The compact optical device of claim 1, wherein the first reflective unit is disposed between the first surface and the second surfaces in order to reflect the image light corresponding to the image for augmented reality toward the second reflective unit.

5. A glasses-shaped augmented reality providing apparatus comprising:
a lens unit configured to transmit at least part of image light, output from a real object, therethrough toward a pupil of an eye of a user; and
a frame unit configured to fix the lens unit;
wherein the lens unit is the compact optical device for augmented reality set forth in claim 4.

6. The compact optical device of claim 1, wherein the first reflective unit is formed in a curved shape.

7. A glasses-shaped augmented reality providing apparatus comprising:
a lens unit configured to transmit at least part of image light, output from a real object, therethrough toward a pupil of an eye of a user; and
a frame unit configured to fix the lens unit;
wherein the lens unit is the compact optical device for augmented reality set forth in claim 6.

8. The compact optical device of claim 1, wherein the first reflective unit is a concave mirror.

9. A glasses-shaped augmented reality providing apparatus comprising:
a lens unit configured to transmit at least part of image light, output from a real object, therethrough toward a pupil of an eye of a user; and
a frame unit configured to fix the lens unit;

wherein the lens unit is the compact optical device for augmented reality set forth in claim 8.

10. The compact optical device of claim 1, wherein the first reflective unit has a length less than 8 mm in a widthwise direction thereof.

11. The compact optical device of claim 1, wherein the second reflective unit is disposed at an inclined angle with respect to a surface of the optical means in order to reflect the image light corresponding to the image for augmented reality, transferred from the first reflective unit, and transfer the image light corresponding to the image for augmented reality toward the pupil of the eye of the user.

12. The compact optical device of claim 1, wherein the optical means is a lens having a refractive index.

13. A glasses-shaped augmented reality providing apparatus comprising:
a lens unit configured to transmit at least part of image light, output from a real object, therethrough toward a pupil of an eye of a user; and
a frame unit configured to fix the lens unit;
wherein the lens unit is the compact optical device for augmented reality set forth in claim 1.

14. The glasses-shaped augmented reality providing apparatus of claim 13, wherein a vision correction lens having a refractive index is disposed on at least any one of outer and inner sides of the lens unit, or all or part of the lens unit is composed of a vision correction lens having a refractive index.

15. A compact optical device for augmented reality, the compact optical device comprising:
an optical means configured to transmit at least part of image light, output from a real object, therethrough toward a pupil of an eye of a user and to reflect image light corresponding to an image for augmented reality, output from an image output unit, on an inner surface thereof and transfer the image light corresponding to an image for augmented reality to a first reflective unit;
a first reflective unit disposed inside the optical means, and configured to reflect the image light corresponding to the image for augmented reality transferred from the inner surface of the optical means by reflection and transfer the image light corresponding to the image for augmented reality to a second reflective unit; and
a second reflective unit disposed inside the optical means, and configured to reflect the image light corresponding to the image for augmented reality, transferred from the first reflective unit, and transfer the image light corresponding to an image for augmented reality toward the pupil of the eye of the user, thereby providing the image for augmented reality to the user;
wherein the second reflective unit has a size smaller than 8 mm, and
wherein the second reflective unit includes a plurality of second reflective units; and
each of the second reflective units is arranged such that the image light corresponding to the image for augmented reality transferred from the first reflective unit is not blocked by remaining second reflective units.

16. The compact optical device of claim 15, wherein the size of each of the plurality of second reflective units is smaller than 8 mm.

17. The compact optical device of claim 15, wherein at least some of the second reflective units have curved surfaces.

18. The compact optical device of claim 17, wherein at least some of the second reflective units have an inclined angle different from an inclined angle of remaining other second reflective units.

* * * * *